United States Patent [19]

Lacey

[11] 3,710,024

[45] Jan. 9, 1973

[54] PROTECTIVE TELEPHONE ALARM SYSTEM

[76] Inventor: Warrick T. Lacey, 1042 Roxbury Court, Columbus, Ohio 43219

[22] Filed: Nov. 12, 1970

[21] Appl. No.: 88,583

[52] U.S. Cl. ....................179/5 P, 179/100.1 R

[51] Int. Cl. ....................H04m 11/04

[58] Field of Search ....................179/5 R, 5 P, 100.1 R

[56] References Cited

UNITED STATES PATENTS 3,595,999 7/1971 Cole ....................179/5 P

*Primary Examiner*—Ralph D. Blakeslee
*Attorney*—Frank H. Foster

[57] ABSTRACT

A protective alarm for automatically connecting itself to a telephone line, dialing a remote telephone and delivering an audio message to the remote telephone, in response to an intrusion. The alarm has a magnetic tape and an associated tape player. On the tape is recorded a 5-kilohertz control signal 100 percent modulated by telephone dialing pulses which are followed by an oral message that is superimposed on the continous control signal. A dialing switch connects the audio output of the tape player to the telephone line when an intrusion switch located, for an example in a window, is opened. A bi-polar transistor controls the dialing switch. The transistor is biased to cause the dialing switch to disconnect the telephone from the alarm system. The transistor circuit responds to the presence of the control signal by connecting the alarm to the telephone line when the control signal is present. An intrusion opens an intrusion switch, begins the magnetic tape player which, in turn, permits the modulated control signal to turn the dialing switch on and off and thereby dial a remote phone. The oral message is then delivered to the remote location.

8 Claims, 2 Drawing Figures

PATENTED JAN 9 1973

3,710,024

INVENTOR.

BY WARRICK T. LACEY

Frank H. Foster
Attorney

PROTECTIVE TELEPHONE ALARM SYSTEM

BACKGROUND OF THE INVENTION

This invention relates to an alarm system and more particularly relates to a structure for automatically dialing a remote telephone in response to an intrusion and then automatically delivering an oral message to the remote telephone.

For years, men have sought to provide themselves with protection for their homes from burglars, fire and other dangerous intrusions when the homeowner is not present. Many systems have been devised for this purpose including systems which provides warning signals at remote police stations or fire houses. One type of device which has been broadly suggested in the past is one in which a message may be recorded for playing to a remote party if a danger situation would exist in his home when the homeowner was not present. For example, the homeowner might record the message that a burglar has entered his house, that he is not home and that the police should be sent to his address. He would then state his address. A danger situation will cause such a system to automatically dial a preset remote location and convey a message to that location. The remote location might be the police station or the fire station or it might be a friend or neighbor of the homeowner whose number could be programmed into the system by the homeowner himself.

There is however, a need for an improved device of this type which can be provided at a reduced cost allowing anyone who has a phone to have the benefit of this type of protection.

SUMMARY OF THE INVENTION

The alarm of this invention has an audio playback means for providing a programmed signal at its output including a control signal and an audio message. An electronically operated dialing switch is connected to couple the audio output from the playback means to a telephone line when the dialing switch is closed. When the dialing switch is open, it disconnects the audio output from the telephone line. The dialing switch has an input for controlling its operation. A control signal responsive circuit is connected between the input of the dialing switch and the output of the playback means. The presence of the control signal at the output of the playback means causes the closing of the dialing switch.

An object of the invention is to provide an alarm of improved simplicity and reduced cost.

Another object of the invention is to provide an alarm system which has a maximum flexibility permitting its owner to easily change a number dialed by the telephone alarm and the oral message delivered by the alarm.

Another object of the invention is to provide an alarm which has the capability of dialing several different remote telephones and delivering an oral message to each of these remote telephones to assure that the message will be received by at least one remote location.

Another object of the invention is to provide an alarm which can perform its safety operations and alert authorities without alerting the burglar who may be breaking into the premises.

Further objects and features of the invention will be apparent from the following specification and claims when considered in connection with the accompanying drawings illustrating my invention.

Figure 1:
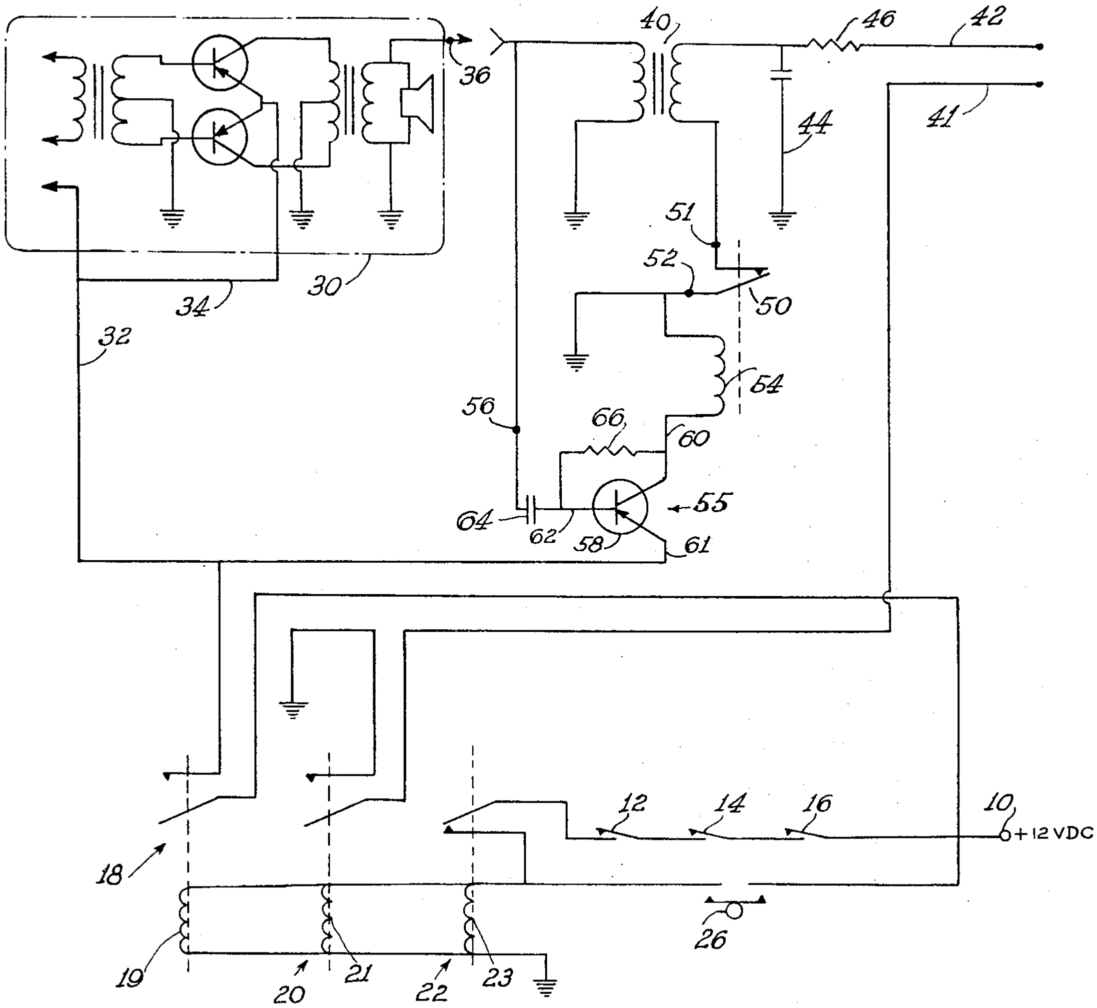
FIG. 1 is a schematic diagram of a preferred embodiment of the invention.

In describing the preferred embodement of the invention illustrated in the drawings, specific terminology will be resorted to for the sake of clarity. However it is not intended to be limited to this specific term so selected and it is to be understood that each specific term includes all technical equivalent which operate in similar manner to accomplish a similar purpose.

DETAIL DESCRIPTION

Referring to FIG. 1, a 12-volt power supply terminal 10 has three intrusion switches 12, 14, and 16 serially connected to it. The intrusion switches are connected in secure sensitive places such as in windows, doors and other places so that a person illegally entering the premises will move an intrusion switch from its closed to its open position. Although three intrusion switches are illustrated, any number of intrusion switches may be serially connected like those illustrated in FIG. 1. The opening of any one switch will actuate the alarm circuit. In addition, light, fire or sound responsive intrusion switches can be used. If desired a manually operable "panic button" can be used as an intrusion switch. Such a panic button switch could be operated by a person when a danger is observed and such operation would be considered an intrusion for purposes of this application. Three electrically operated alarm switches 18, 20, and 22 have their input terminals parallel connected to each other and serially connected to the intrusion switches 12, 14 and 16 and to the power source terminal 10. The preferred alarm switches are relays having their coils 19, 21, and 23 parallel connected.

The alarm switch 18 is a normally closed, power connect relay having its switch terminals connected between the source of power 10 and the electronic circuitry of the alarm. When the coil 19 is de-energized, power is applied to the electrical circuitry of the alarm. The alarm switch 20 is a normally closed line connect relay having its switch terminals connected between the telephone line and the alarm system circuitry. The alarm switch 20 serves to connect the alarm to the telephone line when an intrusion occurs. Otherwise the alarm is disconnected so that it will not interfere with normal telephone service. THe alarm switch 22 is a normally open lockout relay having its switch terminals serially connected to the intrusion switches and to the parallel connected coils 19, 21 and 23. A reset switch 26 is connected to apply power when depressed, to the coils 19, 21, and 23.

Closing of the reset switch 26 immediately energizes the coils 19, 21, and 23. Closing the contacts of the lockout alarm switch 23 permits the closed intrusion switches 12, 14 and 16 to continuously supply power to coils of the alarm switches 18, 20 and 22 and to maintain them in an energized condition after the reset switch 26 is opened. Opening of any of the intrusion switches by an illegal intrusion will immediately de-energize the relay coils 19, 21 and 23. Opening of the contacts of the lockout alarm switch 22 will prevent the coils 19 and 21 from being re-energized if the burglar later closes the intrusion switch such as by closing the window through which he entered. Thus, the lockout switch 22 prevents inhibiting of the circuit.

It should be clear that the alarm switches 18, 20 and 22 and all other switches described in this application might be reed switches or electronic switches such as transistors. Such direct substitution of one type of switch for others being well-known in the art.

An audio playback means 30 is depicted somewhat diagramatically in a "black box". The circuitry shown in the "black box" depicting the audio playback means 30 is merely the output circuitry of a magnetic tape player. The power supply conductors 32 and 34 by which power is supplied to the tape player are shown connected to the power connect alarm switch 18 to receive power through it. An audio output terminal 36 is also shown connected to the audio playback means 30. The connections for the conductors 32 and 34 and to the output terminal 36 may be easily made to a conventional tape recorder. Such a recorder operates quite well with this invention. It should be understood that all ground connections indicated on the diagram are grounds to the chassis of the alarm circuit.

An impedance matching audio transformer 40 couples the output from the playback means 30 to the telephone line, comprising conductors 41 and 42 through a low pass filter. The filter comprises a capacitor 44 and a resistor 46 and functions to filter out the control signal as discussed below. The primary of the audio transformer 40 is connected to the output terminal 36 of the playback means 30. The secondary is serially connected through the low pass filter to the telephone line and to a dialing switch means 50.

The preferred dialing switch means 50 is a normally closed relay having its switch terminals 51 and 52 connected to the secondary of the audio transformer 40 and 51 to ground. Closing of the dialing switch 50 connects the telephone lines 41 and 42 to the alarm circuit by connecting the other-wise floating secondary terminal 51 to the ground of the alarm circuit.

The coil 54 of the dialing switch 50 is connected to a control signal responsive circuit means 55 which is in turn connected to a source of power through the alarm switch 18. The preferred control signal responsive circuit is a transistor control switch. The input terminal 56 of the control switch 55 is connected to the output 36 of the playback means. The control switch 55 functions to close the dialing switch in response to the presence of the control signal at the output of the playback means.

The preferred control switch is a bipolar transistor in a common emitter configuration. It's collector terminal 60 and its emitter terminal 61 are connected respectively to the coil 54 of the dialing switch 50 and to the switch terminals of the power connect alarm switch 18. The transistor input at its base 62 is connected to the output of the playback means 30 by means of capacitor 64. A resistor 66 is connected between the collector terminal 60 and the base terminal 62 and biases the transistor 58 to a relatively highly conducting state. This in turn, energizes the coil 54 and retains the dialing switch 50 in an open position. Therefore the transistor 58 need be biased to provide sufficient current to the dialing switch coil 54 to actuate the dialing switch 50 and open its contact as will be explained below. The presence of the control signal at the input terminal 62 of the control switch 55 will reduce the base voltage and will therefore reduce the current through the transistor. It is necessary that the current reduction be sufficient to de-energize the dialing relay switch 50 and thereby connect the telephone line to the alarm system. Although the circuit would operate with the transistor operating between cutoff and saturation, such extreme operation is not necessary.

Figure 2:
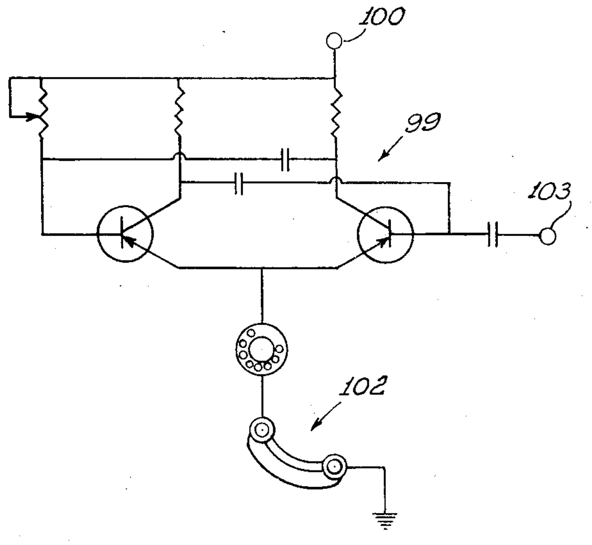
FIG. 2 is a schematic diagram of a circuit used for programming a control signal and audio message onto the playback means of the invention.

FIG. 2 illustrates an oscillator for connection to a telephone in order to program the magnetic tape used in the playback means 30 illustrated in FIG. 1. The circuit in FIG. 2 is a conventional free-running multivibrator oscillator which is connected to a power supply terminal 100. It is connected to ground through a dial telephone 102. When the oscillator 99 is connected to ground through the telephone 102, it will oscillate at a frequency which will be the control signal frequency. Although the circuitry of this invention can be modified for almost any control signal frequency, I prefer to use a control signal in the range between 5KHz and 7KHz.

The magnetic tape is programmed by connecting the tape recorder input to the oscillator output terminal 103. The oscillator begins operating at the control frequency which is then recorded on the magnetic tape. Programming then begins by the programmer dialing the number on the telephone which he desires the alarm system to call in case of an intrusion. This will turn the multi-vibrator circuitry 99 on and off in a manner which will provide a 100 percent modulated control signal which is turned on and off according to the telephone number to be dialed. After the programmer has dialed the desired number, he then orally speaks the desired phone message into the telephone receiver. The tape will record the control frequency on which the oral message is superimposed.

The Programmer may, if he wishes, then hang up the telephone 102. This will stop the oscillator oscillations. He may then pick up the telephone, dial a new number and speak another oral message into the telephone. He may then again hang up and repeat this procedure as many times as he wishes. This enables the alarm circuit, as will be better understood, to disconnect the alarm from the telephone line each time a message is delivered and then dial a new number and deliver another message. Thus, the circuit illustrated in FIG. 1 will identically repeat the actions of the programmer when he programs the tape utilizing the circuit of FIG. 2.

OPERATION

To begin the operation of the circuitry, the homeowner first closes and secures all doors and windows to which intrusion switches are attached. In this manner he closed the intrusion switches such as intrusion switches 12, 14 and 16. Next he depresses the reset switch 26 to cause energization of the alarm switch coils 19, 21, and 23. This causes the contacts of the lockout alarm switch 22 to close and thereby retain the alarm switches 18, 20 and 22 in their energized position after the homeowner removes his hand from the reset switch 26 and leaves the premises.

The circuitry is then ready for action assuming that it has been previously wired into the telephone system by a competant installer. The occurrence of an alarm situation, such as the opening of a window, will cause one of the intrusion switches to open. Electrical energy will cease to be applied to the alarm coils 19, 21 and 23 causing them to be de-energized. This will instantly connect the source of power at the power terminal 10 through the power connect alarm switch 18 to the emitter 61 of the control switch 55 and to the playback means 30 through the conductors 32 and 34. Simultaneously, the alarm will be connected to the telephone lines 41 and 42 by the line connect switch 20.

Initially, the transistor 58 will begin conducting and thereby energize the dialing switch coil 54 to open the dialing switch 50 and disconnect the alarm from the line. At the same time, the playback means 30 will warm up and begin its operation. As soon as the prerecorded control frequency appears at the output terminal 36, the transistor 58 will be driven toward cutoff to a relatively low conducting state. This occurs because the base to emitter junction between connections 62 and 61 of the transistor 58 will operate as a diode and rectify the control signal passing through the capacitor 64. This half wave rectified control signal will charge the capacitor 64 and thereby reduce the base to emitter voltage appearing on the base 62. This will of course reduce the conduction of the transistor 58 and thereby de-energize the dialing switch 50 and close its contacts. Thus, with the initial continuous control signal present, the dialing switch 50 connects the alarm to the telephone line and the system is ready for dialing.

The playback of the pulsed control signal, which has been previously modulated by the telephone 102 illustrated in FIG. 2, will now open and close the dialing switch 50 in a manner analagous to the programmer's dialing of the telephone 102. Each time a pulse occurs (when the control signal is absent from the tape) the dialing switch 50 will open and reproduce the effect of the dial on the telephone 102. The stream of pulses will, in this manner, duplicate the function of a telephone in dialing a telephone number.

When dialing is completed, the control signal then continues in a continuous wave. The audio oral message will now appear at the output 36 of the playback means 30. This will be coupled through the audio transformer 40 and through the low-pass filter comprising the capacitor 44 and the resistor 46 and then will be transmitted onto the telephone lines 41 and 42. The control signal will be greatly attenuated by this low pass filter so that it will not appreciably appear on the telephone line.

If the programmer, after dialing the number, and stating his oral message, then hung up the phone 102 and subsequently picked it up again to dial a new number and state another oral message, the tape will cease playing the control signal which, inturn, will permit the the transistor 58 to begin its state of relatively high conduction. This will energize the coil 54 of the dialing switch 50 and disconnect the alarm system from the telephone lines. The effect will be that of hanging up the alarm system and thereby disconnecting the remote telephone from the circuit. If the programmer then again picked up the telephone and dialed a new number, the control signal will now re-appear on the magnetic tape and be reproduced at the playback output 36. This will again connect the alarm circuit to the telephone line by closing the contacts of the dialing switch 50, as described above. Dialing will then be repeated and the steps described above will be repeated so that a new number is contacted and a new oral message will be delivered.

It is to be understood that while the detailed drawings in specific examples given describe preferred embodiments of my invention they are for the purposes of illustrations only. The apparatus of the invention is not limited to the precise details and conditions disclosed and various changes may be made therein without departing from the spirit of the invention which is defined by the following claims. For example it is well known that PNP and NPN transistors may be interchanged by suitably changing the power source polarities and changing other circuit parameters in well known ways.

I claim:

1. A protective alarm for connection to a telephone line and for automatically dialing a remote telephone and delivering an audio message in response to an intrusion, the alarm comprising:

a. an audio playback means for providing a programmed signal at its output including a control signal and an audio message;

b. an electronically operated electromechanical dialing switch means having an energization coil and connected to couple the audio output of said playback means to said telephone line when said dialing switch means is closed and to disconnect the telephone when said dialing switch means is open and having an input for operating said dialing switch;

c. a control signal responsive circuit means connected between the input of said dialing switch means and said playback means output for causing the closing of the dialing switch means in response to the presence of said control signal at said output, said control signal responsive circuit means comprising a transistor having its output switching terminals connected to said energization coil and a source of power and having a capacitor connecting the transistor input to the output of said playback means, the transistor being d-c biased to hold the dialing switch means in an open state; and d. an impedance matching audio transformer connected to couple the output of said playback means to said telephone line, the primary being connected to the output and the secondary being serially connected to said telephone line and said dialing switch means.

2. An alarm according to claim 1 wherein said transistor is a bipolar transistor in a common emitter configuration and biased into conduction by a resistance connected between its base and its collector and wherein the input circuit of said transistor has a time constant sufficiently longer then the period of said control than and sufficiently shorter than the period of telephone dialing pulses that said control signal will charge the capacitor to cut off said transistor in a time interval substantially less than a dialing pulse.

3. A protective alarm for connection to a telephone line and for automatically dialing a remote telephone and delivering an audio message in response to an intrusion, the alarm comprising:

a. an audio playback means for providing a programmed signal at its output including a control signal and an audio message said playback means comprising a magnetic tape and an associated tape player and said programmed output being recorder on the tape and including in sequence:

1. a stream of control signal pulses formed by said control signal substantially 100 percent modulated by telephone dialing pulses, said pulses representing the telephone number of said remote telephone; and, subsequently, 2. an audio message superimposed on a continuous control signal b. an electronically operated dialing switch means connected to couple the audio output of said playback means to said telephone line when said dialing switch means is closed and to disconnect the telephone when said dialing switch means is open and having an input for operating said dialing switch; and c. control signal responsive circuit means, connected between the input of said dialing switch means and said playback means output, for causing the closing of the dialing switch means in response to the presence of said control signal at said output said control signal responsive circuit means having its switch terminals connected between the input to said dialing switch means and a source of power and having an input for operating the control switch means, the control switch input being coupled to the output of playback means.

4. An alarm according to claim 3 wherein the control signal is a frequency in the range of 5 KHz to 7KHz 5. An alarm according to claim 3 wherein a. an impedance matching audio transformer is connected to couple the output of said tape player to said telephone line, the primary being connected to said output and the secondary being serially connected to said telephone and said dialing switch means;

b. the dialing switch means is a normally closed electromechanical switch having an energization coil;

c. the control switch means is a bipolar transistor being serially connected at its collector and emitter terminals between said energization coil and a source of power for energizing the energization coil when said transistor is in conduction;

d. a capacitor connects the transistor base to said output;

e. a resistance is connected between the collector and the base of the transistor for biasing the transistor in a conducting state and thereby energizing said energization coil to open said dialing switch; and f. the input circuit of said transistor has a time constant sufficiently longer than the period of said control signal and sufficiently shorter than the period of said dialing pulses that said control signal will charge the capacitor to cut off the transistor in a time interval substantially less than a dialing pulse.

6. An alarm according to claim 5 wherein a. a plurality of intrusion actuated switches are serially connected to a source of power for being actuated to an open circuit condition by an undesired intrusion;

b. at least three electrically operated alarm switches are provided having their actuating input terminals parallel connected to each other and serially connected to said intrusion switches and said source of power, for maintaining the alarm switches in an open condition so long as said intrusion switches remain unopened by an intrusion;

c. one of said alarm switches in a normally closed power connect switch having its switch terminals connected between the source of power and said control switch and said playback means for applying power to the control switch and the playback means when an intrusion switch is opened;

d. another of said alarm switches is a normally closed line connect switch having its switch terminals connected between the telephone line and the protective alarm, for disconnecting the line from the alarm until one of said intrusion switches is opened and for then connecting the line to the alarm; and e. another of said alarm switches is a normally open, unlatching switch having its switch terminals serially connected to said intrusion switches and to said parallel connected acutating input terminals to maintain the alarm switches in a closed condition after an intrusion switch has been opened.

7. An alarm according to claim 6 wherein an open biased switch is connected between said source of power and said parallel connected actuating input terminals.

8. An alarm according to claim 3 wherein the alarm switches are electromechanical switches having energization coils and the energization coil terminals are the acutating input terminals.

* * * * *